United States Patent

Platte et al.

[11] Patent Number: 5,940,119
[45] Date of Patent: Aug. 17, 1999

[54] COMMUNICATIONS TERMINAL

[75] Inventors: Hans-Joachim Platte, Hemmingen, Germany; Manfred Spruck, Strasbourg, France

[73] Assignee: Deutsche Thomson-Brandt GmbH, Germany

[21] Appl. No.: 08/615,032

[22] Filed: Mar. 11, 1996

[30] Foreign Application Priority Data

Mar. 24, 1995 [DE] Germany .......................... 195 10 737

[51] Int. Cl.⁶ .................................................. H04N 7/14
[52] U.S. Cl. ............................... 348/16; 348/17; 348/14
[58] Field of Search .............................. 348/14, 17, 13, 348/143, 148–155, 158–159; H04N 7/14, 7/15

[56] References Cited

U.S. PATENT DOCUMENTS

| | | | |
|---|---|---|---|
| 4,646,146 | 2/1987 | Pettubry | 348/149 |
| 5,014,267 | 5/1991 | Tompkins et al. | 370/259 |
| 5,191,601 | 3/1993 | Ida et al. | 348/16 |
| 5,229,850 | 7/1993 | Toyoshima | 348/153 |
| 5,455,561 | 10/1995 | Brown | 348/155 |
| 5,493,329 | 2/1996 | Ohguchi | 348/14 |
| 5,581,297 | 12/1996 | Koz et al. | 348/143 |
| 5,635,981 | 6/1997 | Ribacott | 348/159 |
| 5,654,750 | 8/1997 | Weil et al. | 348/143 |

FOREIGN PATENT DOCUMENTS

| | | |
|---|---|---|
| 0472348 | of 0000 | European Pat. Off. . |
| 0493893 | of 0000 | European Pat. Off. . |
| 0624986 | of 0000 | European Pat. Off. . |
| 4236176 | of 0000 | Germany . |
| 911277U1 | of 0000 | Germany . |
| 6-203601 | of 0000 | Japan . |
| 6-209444 | of 0000 | Japan . |
| 6-296206 | of 0000 | Japan . |
| 6-350725 | of 0000 | Japan . |
| 2-128584 | 5/1990 | Japan ............................... H04N 7/14 |
| 2-299381 | 12/1990 | Japan ............................... H04N 7/14 |
| 8051611 | 2/1996 | Japan ............................... H04N 7/14 |

OTHER PUBLICATIONS

JP 3-166888 A., In: Patents Abstracts of Japan, E-1123 Oct. 17, 1991, vol. 15, No. 408.

Copy German Search Report.

*Primary Examiner*—Forester W. Isen
*Assistant Examiner*—Xu Mei
*Attorney, Agent, or Firm*—Joseph S. Tripoli; Peter M. Emanuel; Frederick A. Wein

[57] ABSTRACT

There is disclosed a communications terminal, including a video telephone, for transmitting and receiving video and audio. The terminal includes video recording apparatus and video reproduction apparatus with the video recording apparatus being switchable into an "off" mode by operation of a flap. In order to use the transmission capacity of the communications terminal even when the flap is closed, an image which already exists in a video memory is transmitted. A changeover is automatically made to the video memory by operation of the flap.

4 Claims, 1 Drawing Sheet

COMMUNICATIONS TERMINAL

BACKGROUND

The invention is based on a communications terminal for transmitting and receiving video and audio, which contains video recording means and video reproduction means, it being possible to switch the video recording means off.

Communications terminals of this type are known, for example as a video telephone or videophone. These make it possible for a user to converse electronically with another user over a relatively long distance. Images of the users are in this case transmitted in both directions at the same time.

A video telephone in which the recording means, in this case a camera, can be switched off by means of a flap is known from the Zeitmagazin [Time Magazine], No. 10, 3.3.1995, pages 24–27.

In this context, the term communications terminal also means other equipment which makes it possible to transmit video and audio in two directions for communication via a telecommunications system. Thus, for example, personal computers can be retrofitted with video recording means and video reproduction means so that it is possible, using said means, to transmit video and audio between their users.

SUMMARY OF THE INVENTION

The problem arises for a user of the communications terminal that he can be called at any time of day by a known or unknown person and this person sees the user and his private environment, possibly at an undesirable point in time.

The object of the invention is thus to develop the communications terminal in such a manner that a caller is prevented from having undesired views of the private environment of a user, without this limiting the transmission capacity and the use of a communications terminal.

The communications terminal is therefore equipped in a known manner with means using which the video recording means (camera) can be switched off, for example when a call arrives and the user does not automatically want transmissions to be permitted live. However, since the user is interested in continuous video transmission an image of the user, which is stored in the communications terminal, is transmitted according to the invention, at least as long as the system is not switched to normal camera operation. A stored image can be transmitted once or continuously, or else an image sequence can be transmitted.

An advantageous development of the communications terminal comprises said terminal containing a video memory in which images of a plurality of people, for example of a family, a group or of individual members of said group are stored, and a user can look for a desired image, which is intended to be transmitted when a call arrives, before booting up the communications terminal.

The communications terminal can also be operated in such a manner that an image from the video memory is automatically transmitted when the video recording means are switched off. A changeover to the video recording means can then be made, as desired, during operation.

The communications terminal, which is used by a group of people, can be set, for example, such that a standard image, for example of this group, is transmitted first when a call arrives. A user from this group can then change over to his personal image, which is stored in the video memory, during operation. Alternatively, the communications terminal can be equipped with speaker identification means, which automatically change over to the image of the person speaking. The communications terminal can also be equipped with means for image processing, using which the articulation and mimicking of the user speaking are evaluated and are incorporated into the image of the video memory which is currently being transmitted.

The images which are stored in the video memory can be produced in an advantageous manner using the communications terminal. The video recording means which are provided on the equipment are used for this purpose, it being possible for the user to monitor the image on the associated monitor. The image can then be stored in the video memory by pressing a button, as desired.

DESCRIPTION OF THE PREFERRED EMBODIMENT

Figure 1:
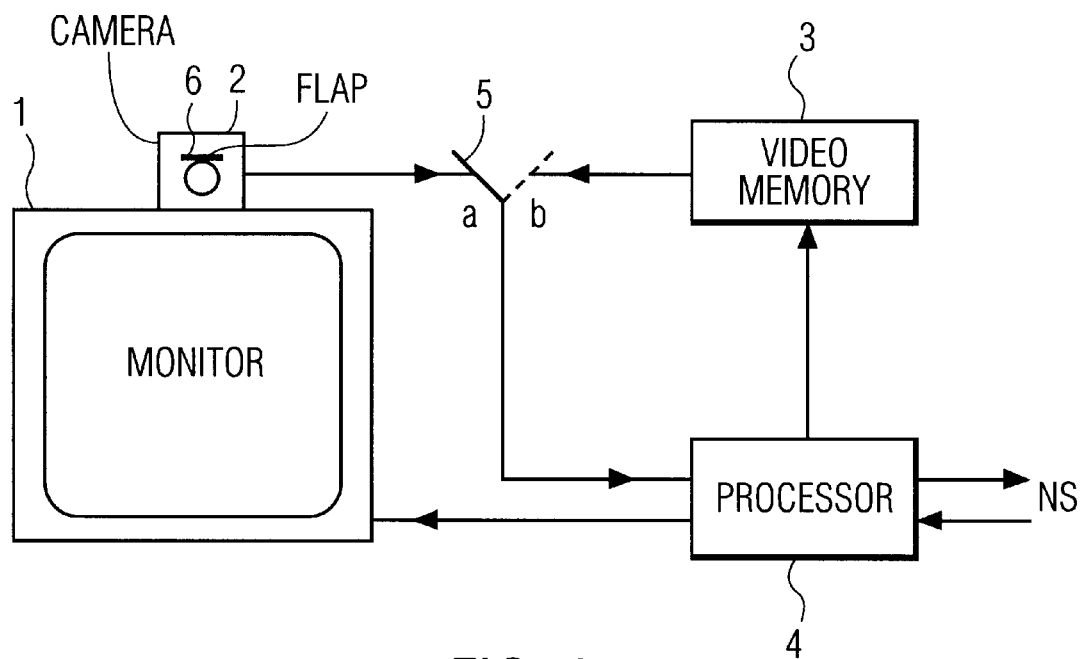

An advantageous refinement of the invention is explained in more detail with reference to the schematic FIGURE.

The FIGURE illustrates schematically a video telephone which contains a monitor 1 for video reproduction and a camera 2 for video recording. The video telephone makes it possible to communicate via a telecommunications transmission system between two remote users, video and audio being transmitted in both directions. The means for audio transmission correspond, for example, to a known telephone system and are not illustrated in the FIGURE.

The video telephone also contains a video memory 3 and a processor 4, which is connected between the video memory 3 and the monitor 1 and via which the connection to the telecommunications transmission system NS is made. An image from the camera 2 or an image from the video memory 3 can be transmitted over the telecommunications transmission system NS, as desired, by means of the changeover switch 5.

A flap 6, which switches the camera 2 off when it is closed, is arranged on the camera 2. Closing the flap 6 automatically results in the switch 5 making a changeover to the video memory 3, which then transmits an image from the video memory 3 instead of the image from the camera 2.

The processor 4 can be used for widely different purposes, for example for controlling the changeover switch 5, for reading from the video memory 3, for speech identification or for image processing. Using it, it is also possible to record images of a person via the camera 2, and to store them in the video memory 3. If required, the video memory 3 can store a relatively large set of images. This video memory 3 is, for example, a semiconductor memory or a hard disk. The images remain in the memory 3 even after the video telephone is switched off or in the event of a power failure.

We claim:

1. Communications terminal for transmitting and receiving video and audio in both directions, comprising:
    video recording means and audio recording means and video and audio reproduction means, and
    a processor and storage means, being connected together,
    said processor and said video recording means being connected for recording one or more images of a person using the communications terminal via said video recording means and said processor, said one or more images being subsequently stored in the storage means by said processor,
    the video recording means comprising a flap whereby said video recording means is switchable by said person into an "off" state,
    said processor operative to transmit said one or more stored images of said person when another user is calling and when said video recording means are switched into the "off" state by said flap during use of the communications terminal, and wherein changeover to transmission of said stored images is being made automatically on operation of the flap by said processor by switching from said video recording means to said storage means.

2. Communications terminal according to claim 1, wherein said communications terminal is a video telephone, a videophone or a computer with a camera and a modem connection.

3. Communications terminal for transmitting and receiving video and audio in both directions, comprising:

a camera and audio recording means and video and audio reproduction means, and a processor and a memory, being connected together, said processor and said camera being connected for recording one or more images of a person using the communications terminal via said camera and said processor, said one or more images being subsequently stored in said memory by said processor, the camera comprising a flap whereby said camera is switchable into an "off" state, said processor operative for transmitting a stored image of a person using the communications terminal when another user is calling and when said camera is switched by said person into the "off" state via said flap during use of the communications terminal, wherein changeover to transmission of said stored image is made automatically on operation of the flap by said processor by switching from said camera to said storage means, and wherein said communications terminal further comprises means for automatic speaker identification wherein an image associated with a person using an acoustic channel is selected from a set of images stored in said memory and transmitted over said telecommunications transmission system.

4. Communications terminal for transmitting and receiving video and audio in both directions, comprising:

a camera and audio recording means and video and audio reproduction means, and a processor and storage means in which an image is stored, the camera comprising a flap wherein said camera is switchable by a user into an "off" state, said processor operative for transmitting said stored image when another user is calling and when the camera is switched into the "off" state by said flap during use of the communications terminal, wherein changeover to transmission of said stored image is made automatically on operation of the flap by said processor by switching from said camera to said storage means.

* * * * *